Dec. 23, 1952  D. R. McADAMS  2,623,022
PREPARATION OF A SINTERED HYDROCARBON-SYNTHESIS CATALYST BED
Filed Nov. 16, 1948
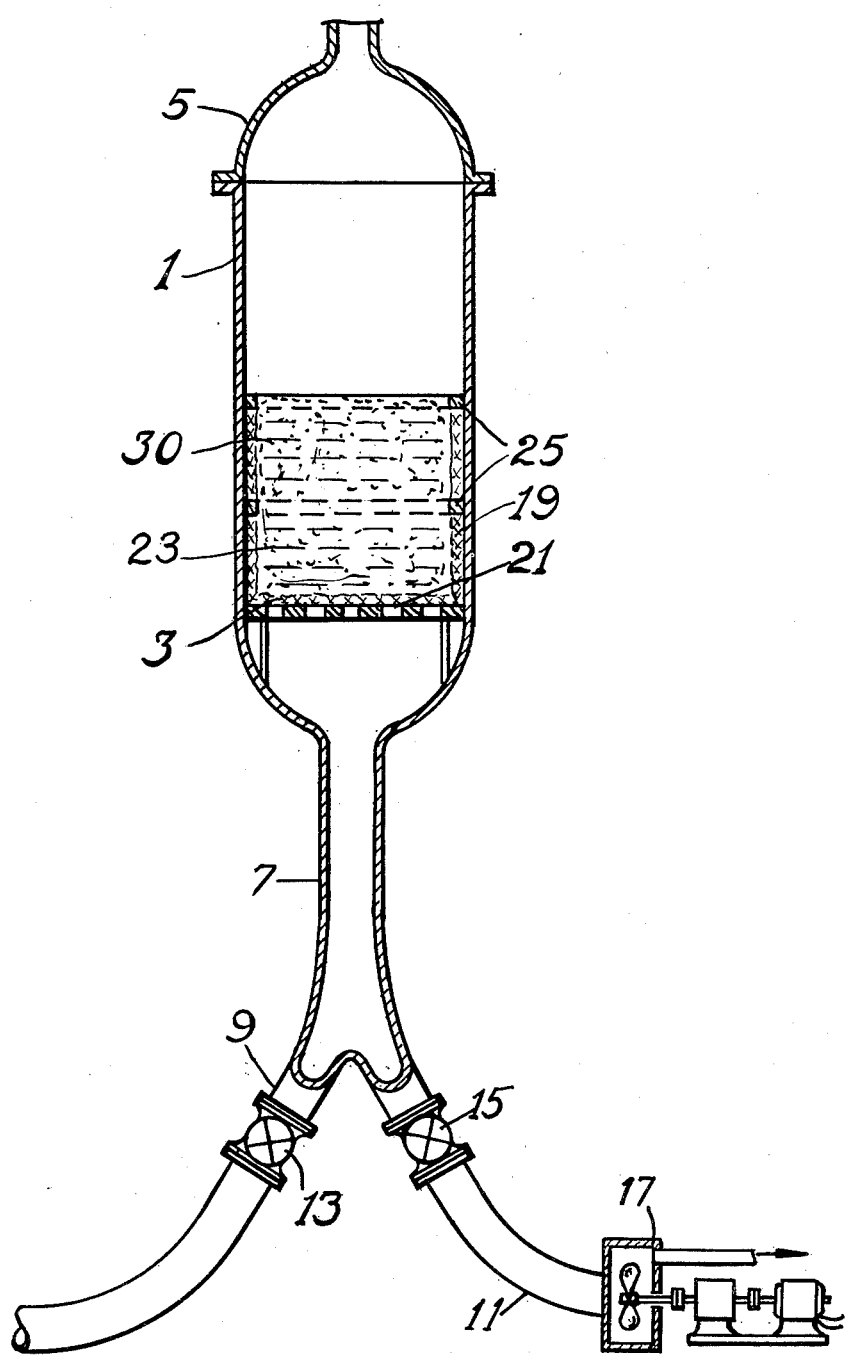
Don R. McAdams Inventor
By J. Cushman Attorney Patented Dec. 23, 1952

2,623,022

UNITED STATES PATENT OFFICE 2,623,022

PREPARATION OF A SINTERED HYDROCARBON-SYNTHESIS CATALYST BED

Don R. McAdams, Baton Rouge, La., assignor to Standard Oil Development Company, a corporation of Delaware Application November 16, 1948, Serial No. 60,300

3 Claims. (Cl. 252—474)

The present invention relates to improved means for contacting fluids with solids and particularly to the preparation of contact masses such as catalysts, solid treating agents, absorbents and the like, to be used for the treatment of gases or liquids. More specifically, the present invention relates to an improved method for charging a treating vessel or reactor with a solid contact mass in the form of a fixed bed of high porosity, great mechanical strength and high stability. The invention may be applied to greatest advantage in charging fixed bed reactors with a contact mass, particularly a catalyst mass, containing a constituent such as iron which will sinter, that is undergo a surface and/or structural deformation and shrinkage when subjected to high temperatures below its fusion point.

Prior to the present invention fixed bed-type reactors for contacting fluids, particularly gases, with solids, have been charged with the solid contact mass by preparing the contact solids outside the reactor in a particulate form such as lumps, pills or powder, filling the reactor with solid particles to the desired height and holding the contact mass in place by mechanical means such as screens, grids or the like. Unless tedious and rather expensive specific means are employed in the preparation of the solid particles they are not of uniform size and shape, which gives rise to channelling in the contact mass during use and thus to a relatively ineffective contact between fluid and solids. In addition, the contact mass changes in porosity and height during continued use due to the stresses of frequent temperature changes and erosion of fragmentation caused by a relative motion of the particles in the high velocity fluid streams, which cannot be entirely avoided even if the contact mass is initially packed so tightly that it is seemingly immovable.

The present invention eliminates these difficulties and affords various additional advantages as will be fully understood from the detailed description given below.

It is, therefore, the principal object of the present invention to provide improved means for contacting fluids and solids.

A more specific object of the invention is an improved method for charging treating vessels with solid contact masses of constant porosity and high stability for the treatment of gases or liquids.

Other objects and advantages will appear hereinafter.

In accordance with the present invention the treating space of the treating vessel is substantially completely occupied by an integral porous sinter of a solid contacting material. It has been found that such sinters of excellent porosity and highest mechanical stability may be prepared in situ as follows.

A contact mass in particulate form containing a constituent capable of sintering at high temperatures in intimately mixed with a non-volatile carbonaceous fuel of low ash content such as coke, coal, or the like, and the mixture is charged to the treating vessel wherein it is supported by some permeable supporting means such as a perforated grid or the like, to fill the reaction space to any desired height. A combustion-supporting gas such as air is passed, downwardly through the relatively loose solids charge, the top layer of the charge is ignited by a flame passed preferably over the entire upper surface of the charge and thereafter the air feed rate is so controlled that the combustion zone travels downwardly through the bed and causes the latter to sinter into an integral porous mass of high porosity and stability. The total charge, prior to sintering, is preferably moistened with a small amount of water, say about 3–10% by weight of the solids, which serves as a binder permitting air to penetrate the charge and also serves to control the rate of carbon combustion. After sintering, the treating vessel may be used for either upflow or downflow feed streams.

In order to prevent packing of the charge prior to sintering the solids mixture may be charged to the treating vessel through a screen or sieve taking care that sufficient coarse material is present to prevent plugging of the holes of the supporting grid and passage of solids mixture therethrough. The supporting grid may also be covered with a layer of relatively coarse particles of contact material or any other refractory material.

The height of the charge is limited to some extent by its tendency to pack under its own weight. Therefore, if the desired height of the contact space is considerable it is preferable to charge the reactor in separate layers of limited height, each layer being charged and sintered separately in accordance with the procedure outlined above.

In order to protect the reactor walls against the high sintering temperatures the walls may be provided with a refractory lining which has preferably the form of an annular layer of porous sintered contact material from a previous reactor charge. Most sintering materials have a tendency to shrink at certain burning conditions, with the result that the charge will pull away from the reactor wall during sintering. The passage of fluid to be treated through the free annular space thus formed may be readily prevented by placing an annulus made of metal or suitable refractory material on top of the sintered charge to close the free wall space.

When charged in the manner described the reactor or treating vessel is ready for use. If the operation involves the deactivation of the contact material during use the sintered charge may be regenerated in situ by conventional means such as treatment with reactivating fluids at reactivating temperatures or burning off deactivating combustible deposits such as carbon, sulfur or the like with air. The temperature of this regenerating treatment should be so controlled that no appreciable resintering occurs during the regeneration period.

While the invention is generally applicable to any sintering contact material such as iron-aluminum oxide spinels, iron silicates, calcium-aluminum silicates, zinc silicates, zinc-aluminum spinels, etc., its greatest utility lies in its application to contact materials containing or essentially consisting of iron group metals or metal oxides, particularly iron and iron oxides proper. The most outstanding of this group of materials are iron-type catalysts used in hydrogenation, hydrocarbon and ammonia syntheses, iron-containing desulfurization agents, reformation catalysts containing nickel supported on difficulty reducible oxides such as magnesia, silica and/or alumina, reformer catalysts of the iron-chromate type, etc.

The proper proportions of solid fuel and contacting material depend on the sintering temperature of the sintering constituent of the contact material and may be readily determined by preliminary routine experiments. They should be so chosen that sintering occurs without any appreciable fusion taking place. In general, large amounts of fuel are conducive to excessive temperatures. The preparation of proper solid mixtures suitable for the purposes of this invention will be illustrated hereinafter for specific types of contact materials.

Having set forth its objects and general nature the invention will be best understood from the following more detailed description wherein reference will be made to the accompanying drawing, the single figure of which is a semi-diagrammatical illustration of an apparatus suitable for carrying out a preferred embodiment of the invention.

The system of the drawing is particularly adapted to charging a reactor for fixed-bed catalytic operation. It will be described with reference to an iron-type synthesis catalyst, but it should be understood, however, that this and similar systems may be used in a substantially analogous manner for charging other contact materials to treating vessels or reactors.

Referring now in detail to the drawing, the apparatus illustrated essentially comprises a vertical treating vessel or reactor 1 provided with a perforated gas distributing grid 3 which also serves as a support for the catalyst charge. The reactor has a removable cover 5 and a gas line 7 branching into pipes 9 and 11 provided with valves 13 and 15, respectively. Pipe 11 is connected to a blower 17 taking suction from pipe 11. The reactor may be charged as follows:

Raw iron catalyst, such as pyrites ash impregnated with about 0.5–3% of potassium carbonate or a similar promoter and ground to a particle size of about $\frac{1}{32}$ in. to $\frac{1}{4}$ in., is intimately mixed with about 5–15% by weight of coke of a similar particle size and about 3–10% by weight of water based on total solids. An annular layer 19 consisting of carbon-free previously sintered iron catalyst of any desired particle size, such as $\frac{1}{2}$ in. to 3 or 4 in., is formed on the reactor wall. Any combustible or readily vaporizable binder, such as wax or heavy naphtha, may be used to hold layer 19 in place during the charging stage. Layer 19 may be about 2 to 4 in. thick and about 10 to 25 in. high. Another layer 21 of previously sintered iron catalyst having a particle size larger than the perforations of grid 3 may be placed over grid 3 in a thickness just sufficient to prevent solid fines from entering the holes of grid 3. Layer 21 may or may not contain carbon.

After reactor 1 is so prepared the mixture of raw catalyst, coke and water is charged to the reactor from above. A sieve, screen or any other suitable distributing device may be used for this purpose to accomplish even distribution and prevent packing of the charge in reactor 1. The reactor is filled with the solids mixture to form a charge 23 having an upper level preferably not exceeding the height of layer 19. Valve 13 is closed, valve 15 is opened and blower 17 is started to draw air from above through solid charge 19, the air leaving reactor 1 via pipe 11.

Now, charge 23 is ignited by passing a flame from any suitable, preferably portable, burner over the entire upper surface of charge 23. When the surface is ignited the flame may be removed and the air flow is adjusted to a linear velocity of about 0.15–1.5 ft. per second within the reactor based on empty reactor space. The actual air velocity through solids charge 23 is substantially higher and may reach 50 to 100 ft. per second. As a result of the air flow, the flame front travels downwardly over the entire cross-sectional area of the charge. At the conditions described the maximum temperature of iron catalyst lies between about 2000° and 2500° F. and the carbon flame moves at a speed of about 0.5–2 in. per minute downwardly through the charge. Since each stratum of the charge is cooled by air immediately upon exhaustion of its fuel content no portion of the charge is exposed to sintering temperatures for more than about 1 minute.

This efficient localization of the sintering treatment at any given time is due in a large measure to the presence of the water added to the charge. This water controls excessive radiant and convective heating of layers not yet subjected to sintering by distilling from the combustion zone into lower zones and redistilling from the latter under the influence of the combustion taking place above.

When the carbon content of charge 23 is substantially completely consumed combustion ceases and the charge is cooled by the continuing air stream. The charge now forms a highly porous integral sinter of high mechanical strength extending in height substantially over the entire height of layer 19 and occupying the cross-section of reactor 1 substantially completely. If the charge has shrunk sufficiently to leave an open annular space around the reactor wall, a metal ring 25 may be placed directly on top of charge 23 which fits closely the inside of reactor 1 or layer 19, depending on the height of charge 23, and which covers the free annular space completely, thus preventing any reaction gases from passing through the open annular space during subsequent use of the reactor for catalytic process purposes.

If charge 23 is sufficient for the desired catalytic operation, cover 5 may now be secured to reactor 1, valve 15 may be closed and valve 13 opened. The reactor is then ready for use in upflow or downflow operation. If a higher catalyst bed is desired a second charge 30 or any desired number of charges may be prepared and placed on top of charge 23 substantially as described in connection with the preparation, charging and sintering of charge 23. The catalyst may be reduced in situ by admitting suitably preheated hydrogen to the charge either via pipe 9 or through cover 5, in a manner obvious to those skilled in the art.

During regeneration periods, air may be drawn through the charge by means of blower 17 to burn carbonaceous deposits; or steam and/or hydrogen or any other regenerating gas or liquid, such as a solvent may be passed over the charge by way of pipe 9.

The invention will be further illustrated by the following specific examples of suitable sintering compositions and procedures.

*Example I*

An amount of 784 grams of a sinter of iron pyrites ash having a particle size of $-\frac{1}{8}$ in., 250 grams of an iron material consisting of iron pyrites ash and about 3% $K_2CO_3$, sintered and ground to a particle size of $-325$ mesh, 262 grams of the same iron material, partially sintered and ground to a particle size of $-4$ mesh, 92 grams of coke having a particle size of $-\frac{1}{30}$ in., and 24.3 grams of $K_2CO_3$ dissolved in 60 c. c. of water were mixed well, charged through a 4 mesh screen to a sinter pot and burned in a conventional manner. After combustion ceased, a solid highly porous body of high mechanical strength was obtained.

*Example II*

An amount of 10,000 grams of a sinter of fine pyrites ash having a particle size of less than $\frac{1}{8}$ in. in diameter, 850 grams of carbon ground to less than $\frac{1}{30}$ in. in size, 150 grams of $K_2CO_3$ and 700 c. c. of water were mixed well, charged through a 4 mesh screen to a sinter pot and sintered as in Example I.

The product after combustion was highly porous as in Example I. In porosity tests the air velocities reached 300 ft. per minute superficial velocity at room temperature with a pressure drop of 10 lbs. per 100 inches of bed depth.

*Example III*

An amount of 200 grams of an iron oxide consisting of sintered iron pyrites ash containing 3% $K_2CO_3$ partially sintered and ground to less than $\frac{1}{8}$ in. in size, 776 grams of an iron pyrites ash sintered less than $\frac{1}{8}$ in. in size, 70 grams of coke of less than $\frac{1}{30}$ in. in size, 24 grams of $K_2CO_3$ and 45 c. c. of water were thoroughly mixed and the mixture was sprinkled by hand into the sinter pot. The charge was sintered as in Examples I and II. However, as a result of the denser packing of the original charge because of the manner charged, the density of the resulting sinter was approximately 10% greater than the product resulting from burning charges made through a 4 mesh screen. This demonstrates the importance of controlling the charging techniques to obtain uniform products.

Integral sintered charges of high porosity and mechanical strength may be formed in an analogous manner from other materials, such as iron-aluminum oxide spinels, etc.

While the foregoing description and exemplary operations have served to illustrate specific applications and results of the invention, other modifications obvious to those skilled in the art are within the scope of the invention.

What is claimed is:

1. The method of preparing in situ in a catalytic reaction zone a promoted iron-type catalyst which comprises mixing a particulate catalyst material containing sinterable iron in a particle size of about $\frac{1}{32}-\frac{1}{4}$ inch intimately with a minor proportion of a potassium compound as catalyst promoter and with about 5 to 15% by weight of coke of a particle size similar to said iron plus about 3 to 10% by weight of water based on total solids, charging the mixture formed into the reaction zone and simultaneously charging thereto a parietal layer of previously sintered catalyst of relatively large particles of the same iron-promoter composition having a size of about $\frac{1}{2}$ to 4 inches in diameter, said previously sintered catalyst particles being unmixed with coke and said coke-catalyst mixture being charged loosely to prevent packing, filling at least a substantial portion of the reaction zone by this charge covering the entire cross-sectional area of said zone, passing an air stream downwardly through the charge thus formed, igniting the fuel at a point close to its top and controlling the air flow rate so as to maintain combustion proceeding downwardly through said charge at maximum temperatures of below about 2000° to 2500° F., whereby the catalyst is sintered without fusion to form a porous integral block of high mechanical strength and high porosity throughout, said highly porous block occupying substantially completely the cross-sectional area of said reaction zone.

2. The method of claim 1 in which at least two of said highly porous blocks are formed successively in the manner claimed therein, in a superimposed position within said vessel.

3. The method of claim 1 in which said particulate catalyst material consists of a pyrites ash which has previously been at least partially sintered.

DON R. McADAMS.

REFERENCES CITED

The following references are of record in the file of this patent:

UNITED STATES PATENTS

| Number | Name | Date |
| --- | --- | --- |
| 858,904 | Ostwald | July 2, 1907 |
| 1,144,730 | Schaefer | June 29, 1915 |
| 1,157,293 | Brockbank | Oct. 19, 1915 |
| 1,183,891 | McMurray et al. | May 23, 1916 |
| 1,433,351 | Dwight | Oct. 24, 1922 |
| 1,502,260 | Lucas | July 22, 1924 |
| 1,502,336 | Casale | July 22, 1924 |
| 1,874,743 | Hornsberger et al. | Aug. 30, 1932 |
| 1,927,286 | Jaeger et al. | Sept. 19, 1933 |
| 1,936,118 | Roka | Nov. 21, 1933 |
| 2,183,146 | Michael | Dec. 12, 1939 |
| 2,447,048 | Baker | Aug. 17, 1948 |
| 2,459,907 | Winslow et al. | Jan. 25, 1949 |
| 2,483,850 | Segura et al. | Oct. 4, 1949 |